(No Model.)
E. FONTAINE.
CURLING TONGS.
No. 472,446. Patented Apr. 5, 1892.
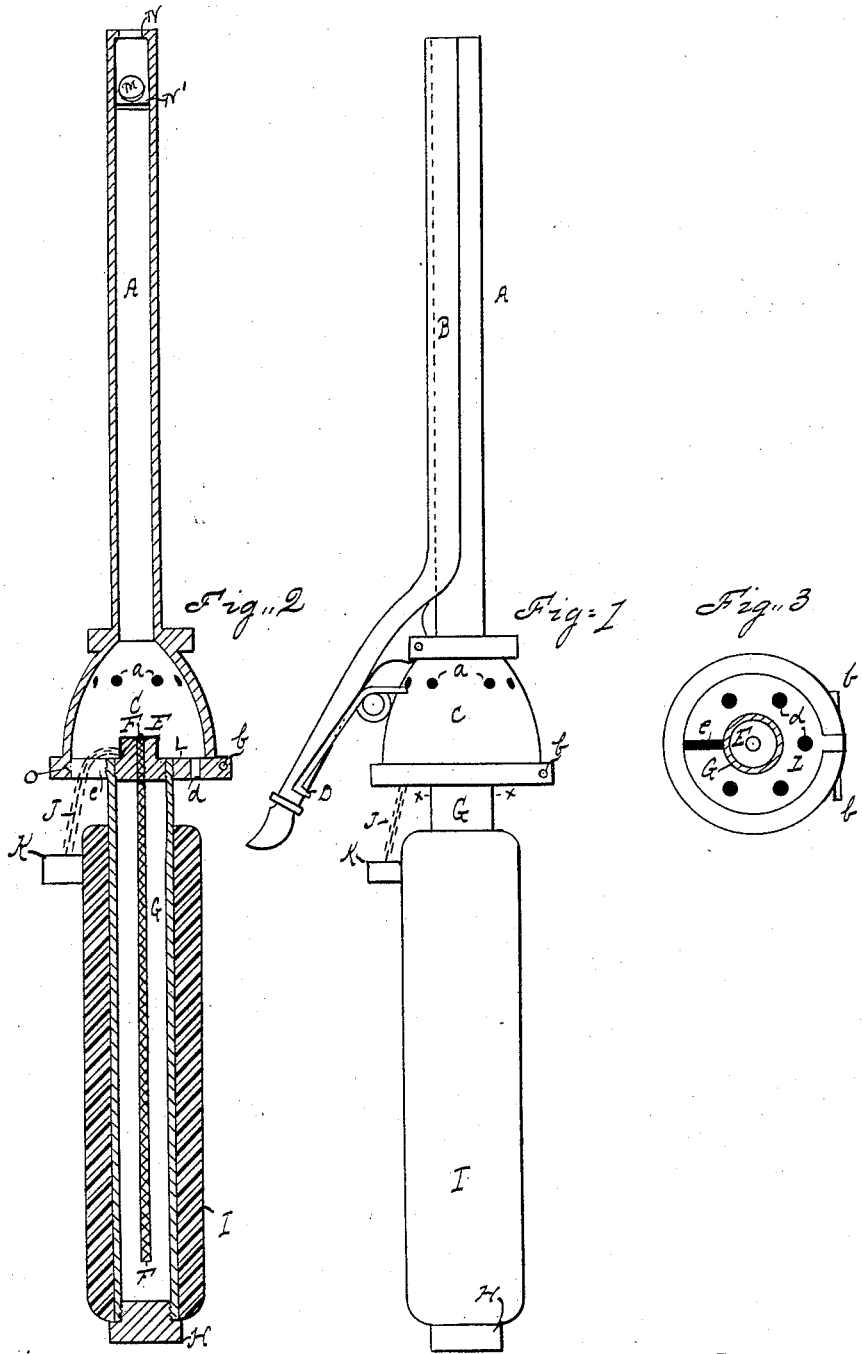
Witnesses
Gertrude H. C. Anderson
Geo. H. Lothrop
Inventor
Eugene Fontaine

UNITED STATES PATENT OFFICE.

EUGENE FONTAINE, OF AUBURNDALE, OHIO, ASSIGNOR TO THE UNION NOVELTY COMPANY, OF SAME PLACE.

CURLING-TONGS.

SPECIFICATION forming part of Letters Patent No. 472,446, dated April 5, 1892.

Application filed June 26, 1891. Serial No. 397,623. (No model.)

*To all whom it may concern:*

Be it known that I, EUGENE FONTAINE, of Auburndale, in the county of Lucas and State of Ohio, have invented a new and useful Improvement in Curling-Tongs, of which the following is a specification.

My invention consists in an improved curling-tongs, hereinafter fully described and claimed.

Figure 1 is a side elevation. Fig. 2 is a central vertical section at right angles with Fig. 1. Fig. 3 is a section on line X X, Fig. 1.

G represents a metal tube forming the body of a lamp having a burner E and wick F, and having its end provided with a screw-plug H, for filling.

I represents a wooden jacket around the body of lamp G to form the handle of the curling-tongs.

L represents a disk secured on the end of lamp G, and $d$ represents a number of perforations through disk L.

A represents the hollow tube of the curling-tongs made of a piece of metal tubing and enlarged at its lower end into a combustion-chamber C, which is hinged at one side to disk L by a pin $b$.

O represents a catch, usually a snap, by which chamber C and disk L are removably locked together opposite the pivot $b$.

$a$ represents a series of perforations in combustion-chamber C, above the burner E, so that the flame from said burner is between the perforations $d$ and $a$.

B represents a curved jaw, adapted to fit over tube A, pivoted to the combustion-chamber C, and provided with a spring D, by which it is normally held in contact with tube A.

N represents a valve-seat in tube A, and M represents a ball-valve adapted to close said seat.

N' represents a pin fastened through tube A to prevent ball M from falling down into combustion-chamber C.

K represents an extinguisher to fit tightly over burner E when the apparatus is not in use, to prevent evaporation of the fluid contained in lamp G, and J represents a chain by which the extinguisher K is connected with the implement, said chain passing out through a narrow slot $e$ in disk L when the implement is being used.

The operation of my invention is as follows: The lamp G being filled with alcohol or other equivalent burning fluid, the tube A is swung on pivot $b$, extinguisher K removed, and the lamp lighted. The tube A is then swung back into position, and while the implement is in an inclined position, as shown in the drawings, or is in any position in which the end tube A is higher than the burner, the heat from the flame passes through said tube and heats the same.

In the use of the curling-tongs the tube A is frequently held horizontal or with its end inclined downwardly, in which case the lamp will go out except for the construction herein shown. When the implement is inverted or inclined downward, the ball-valve M rolls upon and closes the seat N to prevent the passage of cool air up through tube A, and the products of combustion escape through the holes $d$, while the air to support combustion enters through the holes $a$. The air-holes $a$ are preferably made smaller than the air-holes $d$, so as not to interfere with the flame when the tongs are in an upright position. When the tube A is sufficiently heated, the implement is used in the ordinary manner for curling the hair.

What I claim as my invention, and desire to secure by Letters Patent, is—

A curling-tongs having a lamp in its handle, a combustion-chamber at the upper end of the handle, a hair-curling tube extending from the combustion-chamber, air-holes opening into the combustion-chamber both above and below the burner, a valve-seat located in the hair-curling tube, and a valve which closes the valve-seat when the instrument is inverted, substantially as described.

EUGENE FONTAINE.

Witnesses:
GERTRUDE H. ANDERSON,
GEO. H. LOTHROP.